(No Model.)

G. CADE.
NUT LOCK.

No. 271,414.        Patented Jan. 30, 1883.

WITNESSES:
Thos. Houghton
Amos W. Hart

INVENTOR:
George Cade
BY
ATTORNEYS.

UNITED STATES PATENT OFFICE.

GEORGE CADE, OF MILAN, TENNESSEE, ASSIGNOR OF ONE-HALF TO H. P. MILLER, OF SAME PLACE.

NUT-LOCK.

SPECIFICATION forming part of Letters Patent No. 271,414, dated January 30, 1883.

Application filed June 23, 1882. (No model.)

*To all whom it may concern:*

Be it known that I, GEORGE CADE, of Milan, in the county of Gibson and State of Tennessee, have invented a new and useful Improvement in Nut-Locks; and I do hereby declare that the following is a full, clear, and exact description of the same.

My invention consists in a nut-locking device formed by the combination of a tumbler and a fixed washer or plate that holds it in the required position. When in its normal position the tumbler will prevent backward rotation of the nut, so that it cannot become accidentally detached from its bolt, and yet the tumbler, being free to move, will allow the nut to be turned in the opposite direction for screwing it on the bolt. When raised from its normal position, the tumbler allows the nut to be screwed off the bolt. In other words, when in place, the tumbler locks the nut, but does not hinder turning it to clamp the fish-plate, and may be held in such position as to allow the nut to be turned off, if required.

Figure 1:
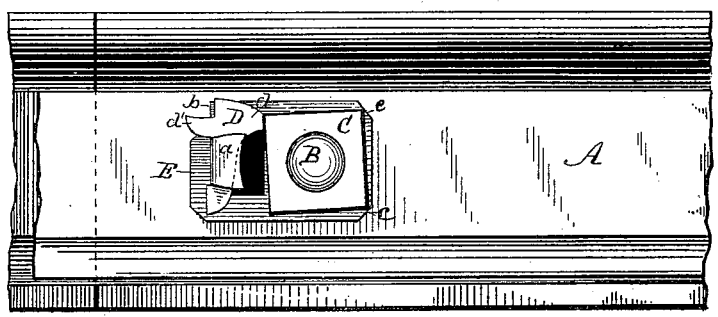
Figure 2:
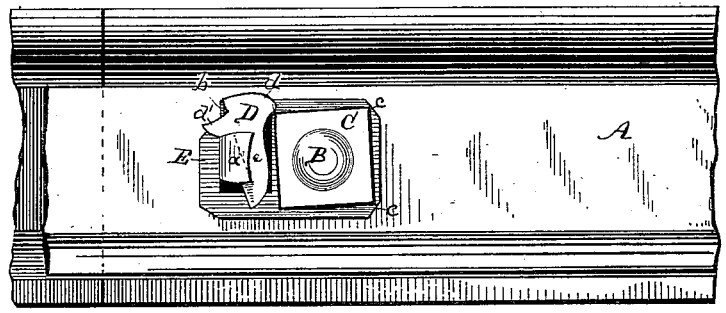
Figure 3:
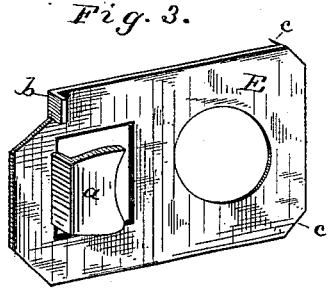
Figure 4:
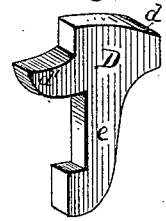

In the accompanying drawings, Figure 1 is side view, showing my improved nut-locking device applied as in practice. Fig. 2 is similar view, except that the tumbler is shown raised by contact with the nut while being screwed on. Fig. 3 is a perspective view of the washer detached. Fig. 4 is a perspective view of the tumbler detached.

The letter A indicates a railroad-rail fish-plate; B, the screw-bolt passing through it, and C the nut, applied to the latter in the usual way and locked by the tumbler D, which is held loosely by the washer E. The latter is cut out of a metal plate by means of a die of suitable construction. By the same means said washer is struck up to form the flange $a$ and lug $b$, which serve to hold the tumbler D in the required position. The screw-bolt B passes through the washer E, and the nut C is screwed against the washer, thus forcing the claws $c$—formed by turning inward adjacent corners of the washer—into the fish-plate, so that the washer is prevented from turning around the bolt.

In case the fish-plate A is constructed of iron, the claws $c$ may be dispensed with and the washer E provided with a projection or arm that will rest against the base or head of the rail, and thus prevent turning of the washer on the bolt.

The tumbler D is of irregular form, having a broad head, $d\ d'$, and elongated shank $e$. It is held in place by contact with the nut C, the flange $a$, and lug $b$—that is to say, the flange $a$ embraces its shank $e$, and the part $d'$ of the head of the tumbler lies between the flange $a$ and lug $b$, so that the tumbler is held loosely in place and prevented from being raised so high as to dislodge it by reason of friction with the nut C when being screwed on. In this its normal position the nose $d$ of the tumbler rests against the side of the nut, and thus prevents it rotating backward or to the left, so that it cannot become accidentally detached. In other words, the nut is locked on its bolt.

In screwing the nut on the bolt B its corners will come in contact with the nose $d$ of the tumbler D and tilt it into the position shown in full lines, Fig. 2, and pass by it, the tumbler dropping back into its normal position after each corner passes. Thus the tumbler offers no obstacle to the rotation of the nut for screwing it on the bolt, and it is obvious that if the tumbler be held raised in such position the nut may be rotated backward or to the left, and thus screwed off the bolt when desired. While, therefore, the tumbler serves as an effectual locking device, it allows the nut to be screwed on or off the bolt at will, and thus possesses an important advantage over such as either prevent rotation of the nut in either direction or in but one. The device is, moreover, simple and cheap, and not liable to be broken or get out of order.

I am aware that a nut-locking device has been devised which is adapted to slide vertically to allow the nut to be screwed on the bolt. I therefore restrict my claim as follows:

The combination of the tumbler, having a broad head, $d\ d'$, and narrow elongated shank $e$, with the washer, having a flange, $a$, and lug $b$, for holding it in the required normal position, yet permitting freedom of movement so that the nut may be screwed on bolt, as shown and described.

GEORGE CADE.

Witnesses:
V. L. WARE,
W. T. FRENZ.